April 22, 1941. H. W. ST. JOHN 2,239,658
ENGINE TRUCK
Filed Dec. 27, 1938 2 Sheets-Sheet 2

INVENTOR
H. W. ST. JOHN
BY
ATTORNEY

Patented Apr. 22, 1941

2,239,658

UNITED STATES PATENT OFFICE 2,239,658

ENGINE TRUCK

Henry W. St. John, Llanerch, Pa.

Application December 27, 1938, Serial No. 247,938

1 Claim. (Cl. 105—201)

This invention relates generally to locomotives and more particularly to an improved center pin and safety interlock for engine trucks.

Continual demand for more powerful locomotives is accompanied by a definite restriction on the physical dimensions of the equipment, such as may be dictated by clearances through tunnels, under bridges, etc. Hence, in order to meet this increased power capacity within the restricted physical dimensions, all available space must be effectively used, but without in any way sacrificing strength of parts, flexibility of the running gear and trucks or the safety of the equipment.

It has been common practice with usual leading engine trucks to provide a center pin bearing with a center pin bolt extending coaxially through the bearing and also to utilize safety chains connecting the truck frame to the main locomotive bed or frame. With heavier and more powerful engines it is desirable to maintain the center pin bearing area as large as possible but the center pin bolt of the prior art has effected some reduction in this area.

It is an object of my invention to provide a leading engine truck having improved means for interlocking the truck and locomotive frame whereby maximum flexibility of the truck may be had while at the same time insuring at all times a close cooperative safety relation between the truck and locomotive. In prior art practice, the slack in safety chains varies widely with the turning of the truck when traveling around curves. My present invention overcomes this variable factor by maintaining a uniform safety relation between the truck and locomotive frame regardless of the turning of the truck.

A further object is to provide an improved safety interlock so constructed and arranged as to perform not only its safety function but also to perform the function of a center pin bolt. As a result of this arrangement, I can omit the customary center pin bolt with a consequent increase in the center pin bearing area. While I have shown my improved arrangement specifically in connection with a six wheel leading engine truck, yet it will be understood that the invention is applicable to trucks having a different number of wheels.

Other objects and advantages will be more apparent to those skilled in the art from the following description of the accompanying drawings in which:

Fig. 4 is a vertical transverse section taken substantially on the line 4—4 of Fig. 1.

Figure 1:
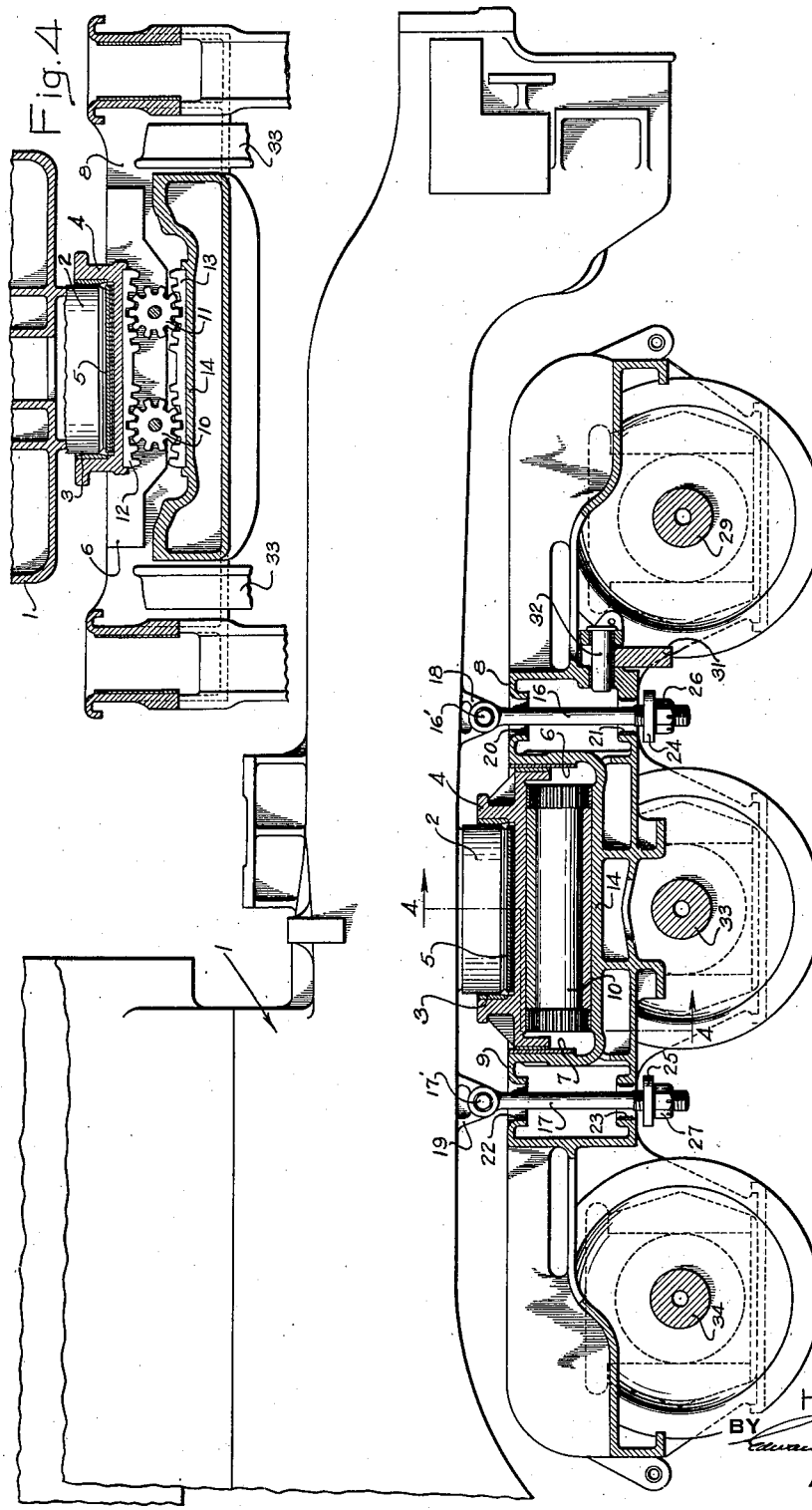
Fig. 1 is a fragmentary side elevation of the front end of an engine bed mounted upon a leading truck shown in section (taken on the line 1—1 of Fig. 2) with my improved invention incorporated therein.

In the particular embodiment of the invention, such as is disclosed herein merely for the purpose of illustrating one specific form among possible others that the invention might take in practice, I have diagrammatically shown the front end of an engine bed or main frame 1 having a center pin 2 rigidly secured to the frame and supported in a suitable center pin bearing or recess 3 which is formed in a laterally movable bolster 4. The bottom horizontal surface of recess 3 is provided with a flat circular bearing plate 5 whose bearing area is continuous within its entire periphery thereby insuring maximum bearing area.

Bolster 4 may be of any suitable form but is herein specifically disclosed as of the type laterally guided by transversely extending parallel surfaces 6 and 7 formed on the inner sides of a pair of truck frame transoms 8 and 9. The bolster is vertically supported on a pair of rollers generally indicated at 10 and 11. Each of the rollers has gears at its opposite ends meshing respectively with upper and lower racks 12 and 13 whose pitch line is curved as shown in Fig. 4. The upper racks 12 (one at each end of each roller) are secured to bolster 4 while the lower racks 13 (one at each end of each roller) are supported on a horizontal web or structure 14 which connects the transoms 8 and 9. The foregoing is a well-known form of centering device and hence further detailed description thereof is not necessary except to point out that the bolster 4 is adapted to have a very considerable extent of lateral movement by reason of there being no bolt passing through the center pin 2 and bolster. In prior arrangements such a center pin bolt would move with the bolster 4 and thereby definitely limit such movement by reason of the bolt possibly striking the geared rollers 10 and 11. Such a center pin bolt would also reduce the bearing area of the center pin.

To obtain the advantages of a center pin bolt without its above two disadvantages and also to provide a safety interlock between the truck and main frame, I have provided a pair of bolts 16 and 17 whose upper ends are transversely pivotally connected at 16' and 17' to suitable brackets 18 and 19 formed preferably integrally with the engine bed 1. These bolts extend downwardly through suitable transversely elongated vertically aligned slots 20 and 21, and 22 and 23, formed respectively in the upper and lower horizontal walls of transoms 8 and 9. The lower slots 21 and 23 are somewhat narrower than the upper slots 20 and 22 to allow for turning of the truck. Suitable enlarged portions, specifically collars or washers 24 and 25, are supported on the lower ends of rods 16 and 17 by nuts 26 and 27. The nuts are adjusted so that the washers have a small clearance with the transoms thereby allowing a normal extent of tilting and turning movement of the truck relative to the engine bed without the washers being engaged by the transoms. This washer clearance will be substantially uniformly maintained regardless of the angle through which the truck may be rotated inasmuch as the slots are transversely elongated to permit full relative lateral movement between the truck and engine bed without disturbance of the relation between rods 16 and 17 and the truck frame. Any arcuate movement that occurs between the truck frame and the upper pivoted end of rods 16 and 17 will be fully compensated for by the ability of the rods to swing about their pivots together with the upper slots 20 and 22 being somewhat wider than the lower slots 21 and 23. Hence there will not be any binding of the rods in their transverse slots.

Figure 2:
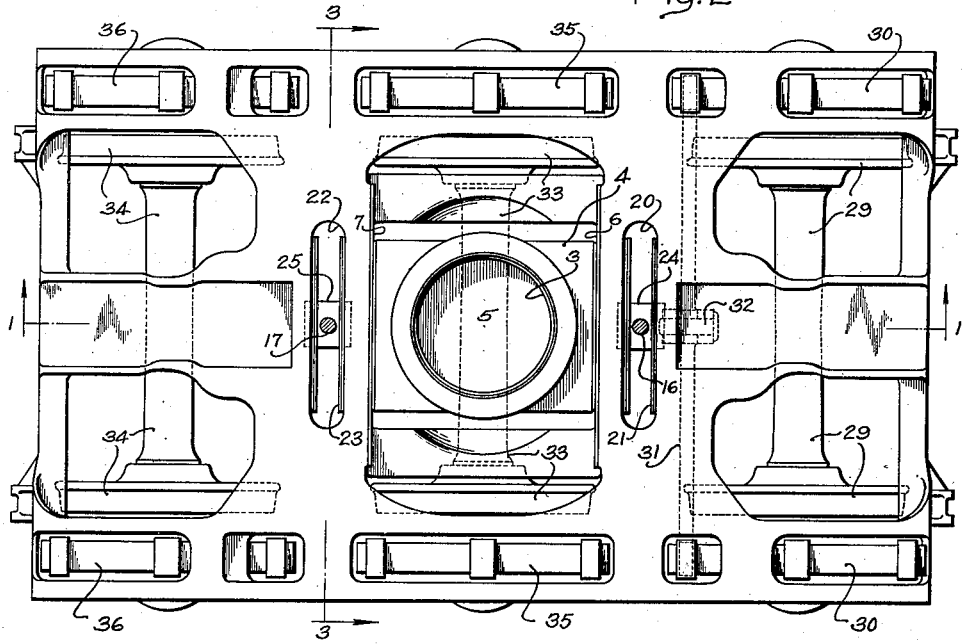
Fig. 2 is a plan view of the truck with the engine bed removed.
Figure 3:
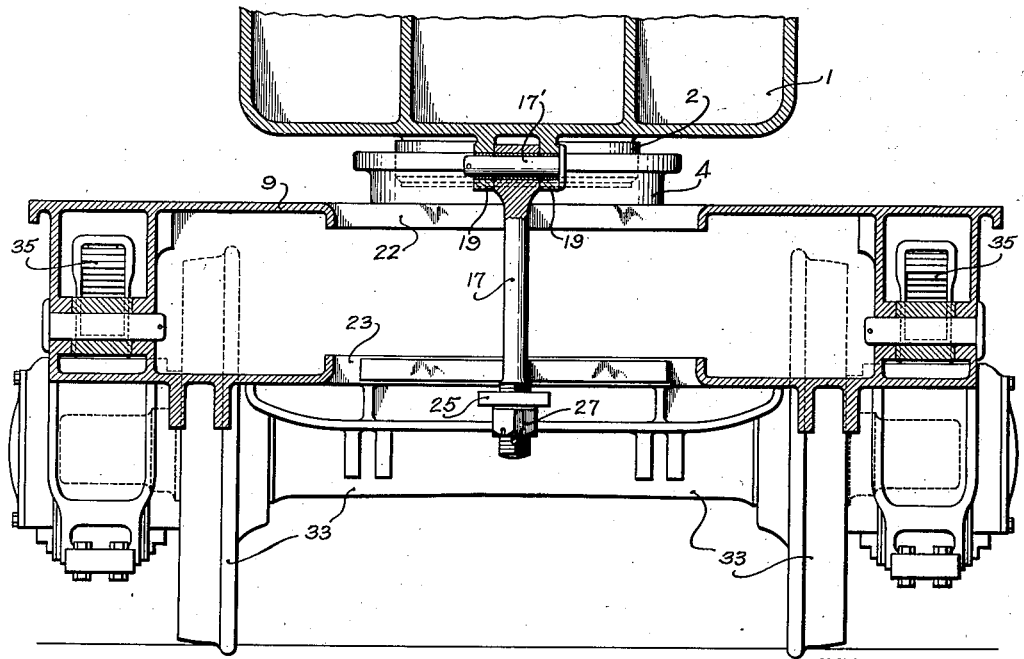
Fig. 3 is a transverse section taken on the line 3—3 of Fig. 2.

Any suitable spring rigging and equalizing system may be employed with the foregoing center pin and safety interlock arrangement but for purposes of illustration I have shown the front wheeled axle 29, Fig. 2, provided with springs 30 whose front ends are suitably connected to the truck frame while the rear ends of said springs are connected to a transverse equalizing beam 31 which pivotally supports the truck frame by a longitudinal fulcrum pin 32. The intermediate and rear wheeled axles 33 and 34 are provided respectively with springs 35 and 36, the adjacent ends of said springs being suitably connected, if desired, through an equalizing lever while the remote ends of said springs may be suitably connected to the truck frame. This spring arrangement gives, in effect, a three-point suspension.

From the foregoing disclosure it is seen that I have provided an extremely simple, rugged and highly effective arrangement for insuring maximum center pin bearing area together with maximum safety interlocking of the engine bed and truck without in any way restricting the remaining elements of the truck or the functions thereof.

It will of course be understood that various changes in details of construction and arrangement of parts may be made by those skilled in the art without departing from the spirit of the invention as set forth in the appended claim.

I claim:

In combination, a locomotive having a main frame, a truck having a frame with spaced transoms each formed of upper and lower spaced walls, a laterally movable bolster disposed between said transoms, a centering device provided with rollers and inclined bearing surfaces therefor disposed between said transoms and interposed between said bolster and truck frame, a center pin and bearing therefor interposed between said bolster and locomotive frame, said spaced walls of the transoms having transversely elongated vertically aliged slots located to the forward and rearward sides of said bolster, the slot of the upper wall being wider than the slot in the lower wall, a plurality of interlocking rods pivotally connected at their upper ends to said locomotive frame and respectively extending through said slots, the wider upper slot allowing the rods to accommodate a maximum pivotal movement of the bolster when in its maximum laterally displaced position while at the same time the lower narrower slot maintains a substantially uniform operative relation between the rods and said lower wall, and enlarged means associated with said rods for engaging an undersurface of said truck thereby to provide a safety interlock between said truck and locomotive frame while allowing free lateral movement of the bolster throughout its full range of lateral movement.

HENRY W. ST. JOHN.